(12) United States Patent
Joshi et al.

(10) Patent No.: US 7,707,275 B2
(45) Date of Patent: Apr. 27, 2010

(54) METHOD AND SYSTEM FOR VALIDATING A CLI/CONFIGLET ON A GIVEN IMAGE

(75) Inventors: Praveen Joshi, Sunnyvale, CA (US);
Richard Livingston, Doral, FL (US);
Balachander Chandrasekaran, Milpitas, CA (US); Kannan Saravanan, Valapadi (IN)

(73) Assignee: Cisco Technology, Inc., San Jose, CA (US)

( * ) Notice: Subject to any disclaimer, the term of this patent is extended or adjusted under 35 U.S.C. 154(b) by 1407 days.

(21) Appl. No.: 11/110,246

(22) Filed: Apr. 20, 2005

(65) Prior Publication Data

US 2006/0242403 A1    Oct. 26, 2006

(51) Int. Cl.
*G06F 15/177* (2006.01)
(52) U.S. Cl. ...................... 709/220; 709/221
(58) Field of Classification Search .......... 709/220–221
See application file for complete search history.

(56) References Cited

U.S. PATENT DOCUMENTS

| | | | | |
|---|---|---|---|---|
| 4,816,994 A | * | 3/1989 | Freiling et al. ............. 706/59 |
| 4,914,590 A | * | 4/1990 | Loatman et al. ............. 704/8 |
| 5,259,766 A | * | 11/1993 | Sack et al. ............. 434/362 |
| 5,590,331 A | * | 12/1996 | Lewis et al. ............. 717/144 |
| 6,006,220 A | * | 12/1999 | Haderle et al. ............. 707/4 |
| 6,138,098 A | * | 10/2000 | Shieber et al. ............. 704/257 |
| 6,182,246 B1 | | 1/2001 | Gregory et al. |
| 6,243,669 B1 | * | 6/2001 | Horiguchi et al. ............. 704/9 |
| 6,596,030 B2 | * | 7/2003 | Ball et al. ............. 715/234 |
| 6,625,590 B1 | | 9/2003 | Chen et al. |
| 6,751,792 B1 | * | 6/2004 | Nair ............. 717/161 |

* cited by examiner

*Primary Examiner*—Ashok B Patel
*Assistant Examiner*—Joshua Collins
(74) *Attorney, Agent, or Firm*—Trellis IP Law Group, PC

(57) ABSTRACT

A method and system for validating a Command Line Interface (CLI) configlet on an image is provided. The method includes creating a parse graph using a plurality of self-describing data constructs, identifying a plurality of parse chain data constructs in the parse graph, deriving at least one CLI/configlet from the image file based on the plurality of self-describing data constructs; and comparing the at least one CLI/configlet derived from the image file with a plurality of CLIs/configlets.

15 Claims, 3 Drawing Sheets

METHOD AND SYSTEM FOR VALIDATING A CLI/CONFIGLET ON A GIVEN IMAGE

BACKGROUND OF THE INVENTION

1. Field of Invention

This invention relates in general to a Command Line Interface (CLI)/configlet. More specifically, the invention relates to validation of a CLI/configlet on an image without running the image on a device.

2. Description of the Background Art

Currently, Internet Operating Systems (IOS) may be supported on multiple platforms and run on multiple trains. As a result, the IOS Command line interface (CLI) command list that is supported may vary across the releases. Validating CLIs on image files running on the IOS therefore becomes critical across the various platforms and trains.

However, in conventional techniques, CLI/configlets supported on an image are not listed. Besides, there are no documents that can accurately list all the CLIs supported on a given release, without running it on a device. Conventional techniques do not determine upfront if a configuration of a CLI configlet will run with an upgraded image.

Currently, users have to configure the CLIs on a device such as a router, to identify if the configuration will be accepted by an image

DETAILED DESCRIPTION OF EMBODIMENTS OF THE INVENTION

Embodiments of the invention provide a method, system, apparatus and machine readable medium for validating a Command Line Interface (CLI)/configlet on an image file. In various embodiments of the invention, the validation is performed without running the image file on a network device. The validation includes extracting a CLI/configlet from the image file and comparing it with a universal set of CLIs/configlets.

Figure 1:
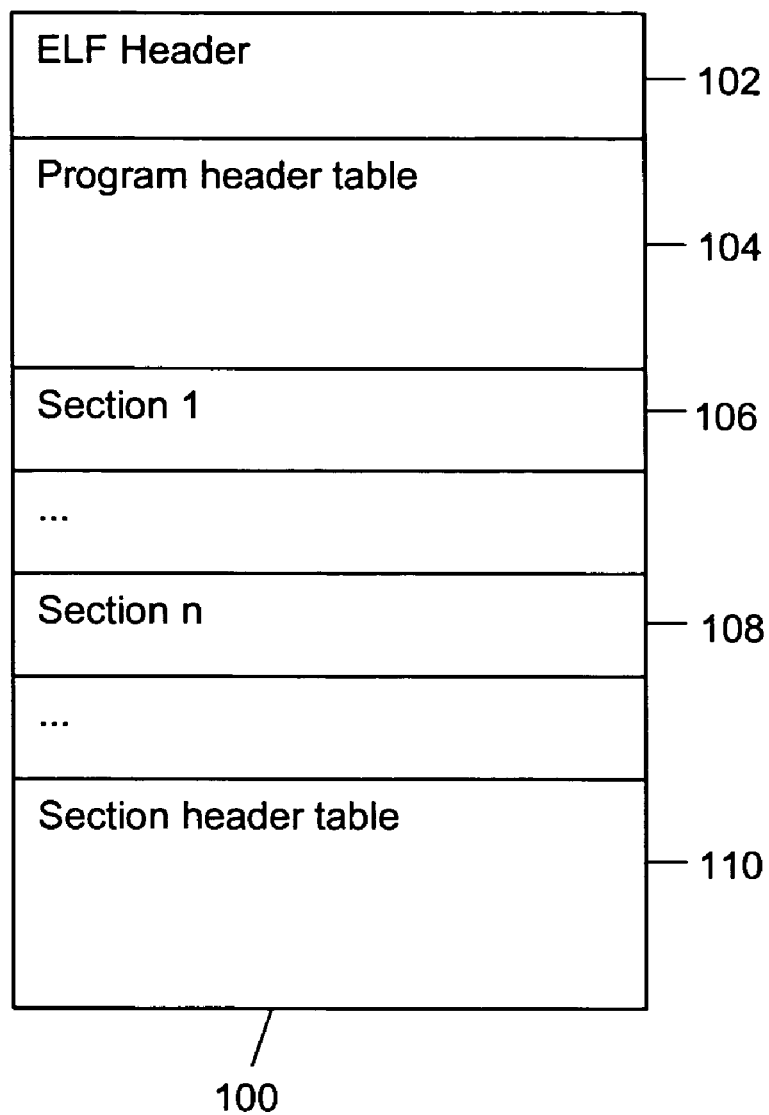
FIG. 1 represents a format of an exemplary image file according to various embodiments of the invention.

FIG. 1 represents a format of an exemplary image file 100 according to various embodiments of the invention. In an exemplary embodiment, image file 100 is in the form of an Executable and Linking File (ELF) and is used for validating a CLI/configlet. Image file 100 may be an object file that includes an ELF header 102, a program header table 104, a section 106, a section 108 and a section header table 110. It is to be understood that the term "image file" as employed herein for various embodiments of the invention including the claims means an image file alone, or an image file including symbols or symbol table information (e.g., a sun file).

ELF header 102 is located at the beginning of image file 100 and holds information describing the organization of image file 100. The organization includes details pertaining to the structure of the various elements in image file 100. Program header table 104 communicates to a system storing image file 100 information related to creating a process image specified by a user. Further, program header table 104 can also provides information about building a process image or executing a program.

Sections 106 and 108 store the object file information for the linking view. Image file 100 may include a plurality of similar sections that provide information including, but not limited to instructions, data, symbol tables, relocation information, and the like.

In various embodiments, each section has an entry in image file 100 and each entry provides information such as the section name, the section size, and the like. Section header table 110 includes information describing the sections of image file 100.

In various embodiments, image file 100 participates in program linking and program execution. In an embodiment of the invention, the format of image file 100 for program linking and program execution remains the same.

Figure 2:
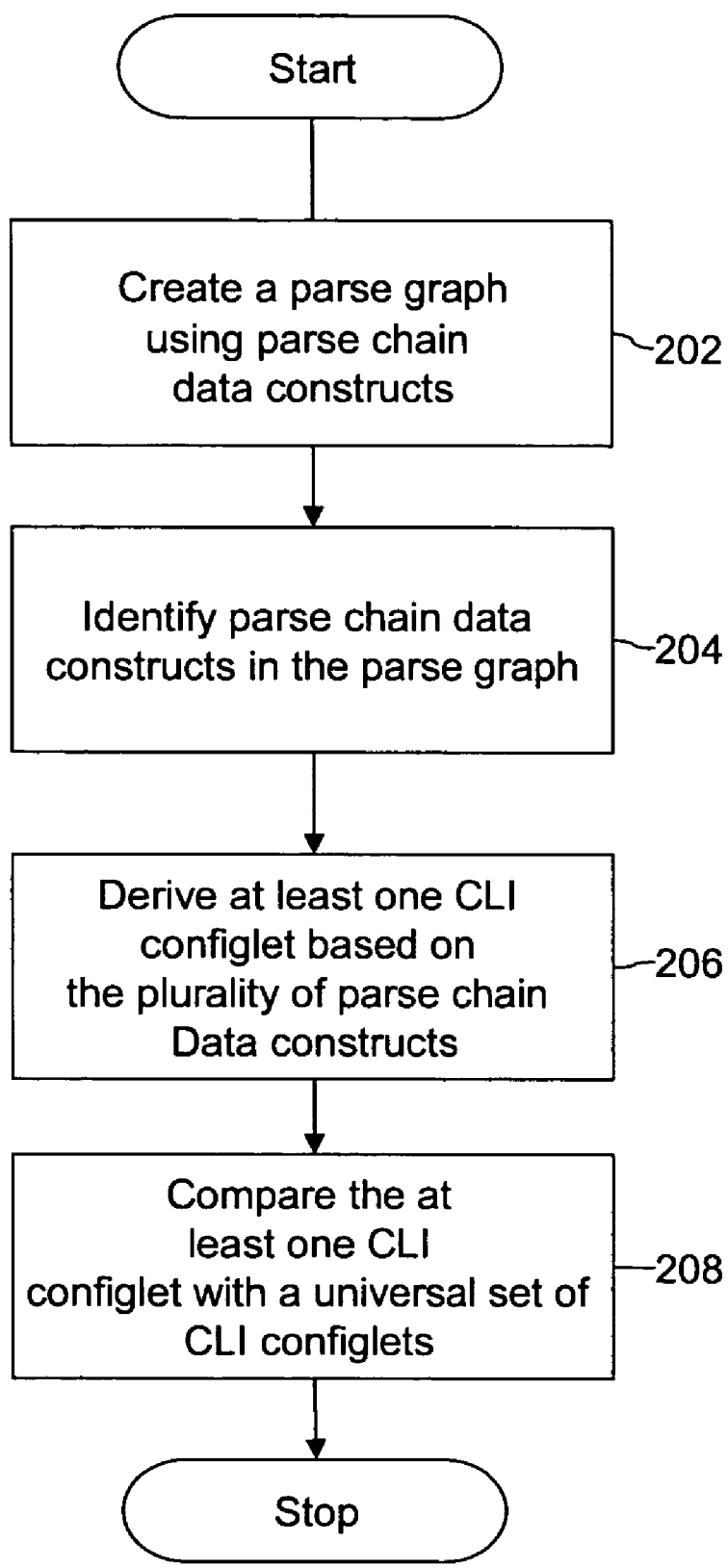
FIG. 2 is flowchart depicting a method for validating a Command Line Interface (CLI)/configlet according to various embodiments of the invention.

FIG. 2 is flowchart depicting a method for validating a CLI/configlet according to various embodiments of the invention. At step 202, a parse graph is created using a plurality of self-describing data constructs.

In various embodiments, the parse graph is a virtual graph that is derived from a plurality of self-describing data constructs created by using image file 100. The data constructs may be, for example, data structures including link points, link exits, parser modes and commands used in an Internet Operating System (IOS) code. In Internet Operating System (IOS) code, parser functions construct parse graph using parser specific data structures like link points, link exits, etc. For each data structure, there is a specific function that acts upon it. Depending upon the call(s) to the parser function, the parameters to the function are identified as link points, link exits and are marked using magic values. In some cases, the parameter values stored as a static variable with predefined name structures. Hence, a walk through of the symbol names can get location of data structures.

In various embodiments, the parse graph may be in the form of a tree structure that enables the viewing of various sub-structures originating from the plurality of self-describing data constructs in the parse graph. It may be noted that the parse graph can be built offline without running image file 100 on a device.

In various embodiments of the invention, the self-describing data constructs may be created by inserting magic values in an IOS code running on a network device, such as a router. The magic values may be random static integers inserted in the IOS code that enable the creation of the above-mentioned data constructs. The calls to parser functions insert static variables with predefined names or magic values.

At step 204, parse chain data constructs are identified in image file 100 using the parse graph created at step 202. At step 206, at least one CLI/configlet is derived from the plurality of parse chain data constructs identified in the parse graph. The symbols in the image file 100 are searched for predefined names and the address of the data structures is collected. The magic values mark the size of the data to be collected. The data is collected using the address and size values and the parse tree is built using these data. At step 208, at least one CLI/configlet derived is compared with a universal set of CLIs/configlets. If a CLI/configlet is present in the universal set, the CLI/configlet is validated.

Figure 3:
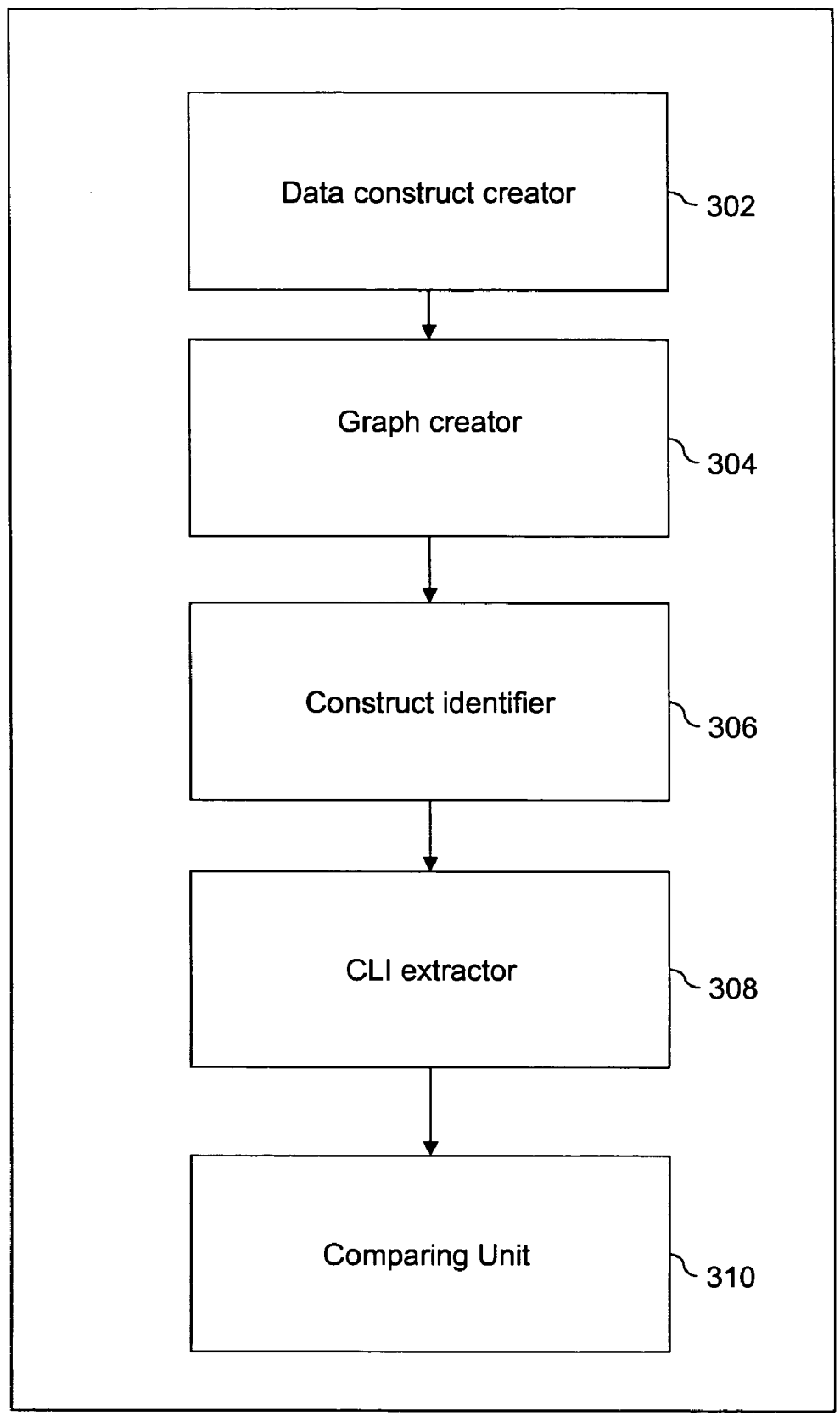
FIG. 3 shows an exemplary system for validating a CLI/configlet in accordance with various embodiments of the invention.

FIG. 3 shows an exemplary system 300 for validating a CLI/configlet in accordance with various embodiments of the invention. System 300 includes a data construct creator 302, a graph creator 304, a construct identifier 306, a CLI extractor 308 and a comparing unit 310. In various embodiments of the invention, each of system elements of system 300 can be implemented in the form of software, firmware and their combination thereof.

Data construct creator 302 creates the plurality of self-describing data constructs after traversing image file 100. Image file 100 is traversed so as to create the relevant plurality of data constructs that enables the CLI/configlet to be extracted according to the method described with reference to FIG. 2.

The self-describing data constructs created by data construct creator 302 is communicated to graph creator 304 to create the parse graph. Once the parse graph is created, construct identifier 406 identifies a plurality of parse chain data constructs. CLI extractor 308 traverses the plurality of parse chain data constructs to derive the CLI/configlet present in image file 100. Thereafter, comparing unit 310 compares the CLI/configlet present with the universal set of CLIs/configlets to validate at least one CLI/configlet.

In an exemplary embodiment, the output of system 300 may be extracted by the use of a command such as the following: show parser dump {command-mode|all} [privilege-level level] [extended] [breakage], wherein 'command-mode' is a keyword indicating the command mode. The output can include the syntax for commands only in a specified command mode. The list of command mode keywords can vary depending on a software image. For example, a command such as 'show parser dump' may be used to display the list of command mode keyword options, wherein 'all' indicates that all commands in all modes should be displayed in the output; 'privilege-level level' is an optional keyword that lists CLI commands only with a privilege level specified in the level argument; 'breakage' is an optional keyword that enables detection of potential parser chain syntax breakage and is intended for internal use; 'extend' is a keyword that enables an extended display mode. The extended parser display shows the keyword and argument descriptions typically shown with the command-line help. This command displays the CLI added to the parse tree. The drawbacks of show parser dump command is CLIs which are dynamically added later based on configuration or insertion of new card into the box are not displayed.

Embodiments of the present invention also provide a web interface that can validate a CLI/configlet by taking in the image name, release information and the CLI/configlet. The web interface calls the offline tool with image name and releases information to retrieve the parse tree and the parse tree will be used to validate the cli/configlet passed in by the user.

Embodiments of the present invention have the advantage of performing a validation for CLIs/configlets for image file 100 without running image file 100 on a device. Various embodiments of the invention enable system 300 to run offline and carry no state information. Further, all commands supported on image file 100 are derived and the output provided by system 300 is always consistent.

Although the invention has been discussed with respect to specific embodiments thereof, these embodiments are merely illustrative, and not restrictive, of the invention. For example, a 'method for validating a Command Line Interface (CLI) configlet for an image' can include any type of analysis, manual or automatic.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain and store the computer program for use by or in connection with the instruction execution system apparatus, system or device. The computer readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims

What is claimed is:

1. A method for validating a Command Line Interface (CLI)/configlet on an image, the method comprising:
    creating a parse graph using a plurality of self-describing data constructs, wherein each of the self-describing data constructs is a parser specific data structure;
    identifying a plurality of parse chain data constructs in the parse graph;
    deriving at least one CLI/configlet from the image file based on the plurality of self-describing data constructs; and
    comparing the at least one CLI/configlet derived from the image file with a plurality of CLIs/configlets, wherein the steps above are implemented by a processor.

2. The method according to claim 1, wherein the image file is an Executable and Linking Format image.

3. The method according to claim 1, wherein the plurality of self-describing data constructs created for the image file comprises a plurality of link points.

4. The method according to claim 1, wherein the plurality of self-describing data constructs created for the image file comprises a plurality of link exits.

5. The method according to claim 1, wherein the plurality of self-describing data constructs created for the image file comprises a plurality of parser modes.

6. The method according to claim 1, wherein the plurality of self-describing data constructs created for the image file comprises a plurality of commands.

7. The method of claim 1 wherein said validating a CLI/configlet on an image is without running the image on a device.

8. A system for validating a Command Line Interface (CLI)/configlet on an image, the system comprising:
    means for creating a parse graph using a plurality of self-describing data constructs, wherein each of the self-describing data constructs is a parser specific data structure;
    means for identifying a plurality of parse chain data constructs in the parse graph;
    means for deriving at least one CLI/configlet from the image file based on the plurality of self-describing data constructs; and
    means for comparing the at least one CLI/configlet derived from the image file with a plurality of CLIs/configlets, wherein the means above are implemented by a processor.

9. A system for validating a Command Line Interface (CLI)/configlet on an image, the system comprising:
    a data construct creator for creating a plurality of self-describing data constructs for an image file, wherein each of the self-describing data constructs is a parser specific data structure;
    a graph creator for creating a parse graph using the plurality of self-describing data constructs;
    a construct identifier for identifying a plurality of parse chain data constructs in the parse graph;
    a CLI extractor for deriving at least one CLI/configlet from the image file based on the plurality of parse chain data constructs; and a comparing unit for comparing the at least one CLI/configlet derived from the image file with a plurality of CLIs/configlets, wherein the elements above are implemented by a processor.

10. The system according to claim 9, wherein the image is an Executable and Linking Format image.

11. The system according to claim 9, wherein the self-describing data constructs created from the image file comprise a plurality of link points.

12. The system according to claim 9, wherein the self-describing data constructs created from the image file comprise a plurality of link exits.

13. The system according to claim 9, wherein the self-describing data constructs created from the image file comprise a plurality of parser modes.

14. The system according to claim 9, wherein the self-describing data constructs created from the image file comprise a plurality of commands.

15. A computer-readable medium including instructions executable by a processor for validating a Command Line Interface (CLI)/configlet on an image, the computer-readable medium comprising:
- program instruction means for creating a parse graph using a plurality of self-describing data constructs, wherein each of the self-describing data constructs is a parser specific data structure;
- program instruction means for identifying a plurality of parse chain data constructs in the parse graph;
- program instruction means for deriving at least one CLI/configlet from the image file based on the plurality of self-describing data constructs; and
- program instruction means for comparing the at least one CLI/configlet derived from the image file with a plurality of CLIs/configlets.

* * * * *